US008161765B2

(12) United States Patent
Marois

(10) Patent No.: US 8,161,765 B2
(45) Date of Patent: Apr. 24, 2012

(54) HEAT EXCHANGE SYSTEM WITH TWO SINGLE CLOSED LOOPS

(75) Inventor: Patrick Marois, Lac-Beauport (CA)

(73) Assignee: Thermodynamique Solutions Inc., Lac-Beauport (CA)

( * ) Notice: Subject to any disclaimer, the term of this patent is extended or adjusted under 35 U.S.C. 154(b) by 859 days.

(21) Appl. No.: 12/219,643

(22) Filed: Jul. 25, 2008

(65) Prior Publication Data

US 2009/0107656 A1    Apr. 30, 2009

Related U.S. Application Data

(60) Provisional application No. 61/001,063, filed on Oct. 31, 2007.

(51) Int. Cl.
*F25D 17/00* (2006.01)
(52) U.S. Cl. ............................................. 62/333; 62/335
(58) Field of Classification Search .................... 62/53.1, 62/79, 332, 333, 335, 468, 434; 165/47, 165/63, 110; 73/23.31
See application file for complete search history.

(56) References Cited

U.S. PATENT DOCUMENTS

| 4,149,585 A | 4/1979 | Sterlini |
| 4,391,104 A | 7/1983 | Wendschlag |
| 4,413,669 A | 11/1983 | Hantelmann |
| 4,550,771 A * | 11/1985 | Arbabian ........................ 165/47 |
| 5,025,634 A | 6/1991 | Dressler |
| 5,379,832 A * | 1/1995 | Dempsey ...................... 165/110 |
| 5,564,282 A | 10/1996 | Kaye |
| 6,609,390 B1 * | 8/2003 | Ueno et al. ...................... 62/335 |
| 7,296,423 B2 * | 11/2007 | Appler et al. ................... 62/114 |
| 7,856,839 B2 * | 12/2010 | Wiggs .............................. 62/260 |
| 2008/0141757 A1 * | 6/2008 | Atkinson et al. ............. 73/23.31 |

* cited by examiner

*Primary Examiner* — Mohammad Ali
(74) *Attorney, Agent, or Firm* — Mila Shvartsman

(57) ABSTRACT

The present invention relates to a heat exchanger comprising at least one first loop adapted to trap energy from a source. The first loop contains a first refrigerant adapted to collect energy from a source. The invention also comprises at least one second loop with a second refrigerant adapted to interact with the first refrigerant and to transfer to a user a maximum quantity of the energy trapped by the first loop in the most efficient manner. The transfer of the trapped energy takes place in a transfer unit placed in the second loop. The transfer unit comprises an outer cylinder with an inlet and an outlet adapted to circulate the first refrigerant. An inner coil placed within the outer cylinder to contain the second refrigerant. The inner coil is provided with an inlet and outlet adapted to facilitate circulation of the second refrigerant. The first and the second refrigerants are moving within the transfer unit in a counter-flow direction to optimize the heat exchange between the first and second refrigerant. The first loop is placed into an earth or waste medium. The first refrigerant is R-410a and the second refrigerant is R-134a.

17 Claims, 10 Drawing Sheets

HEAT EXCHANGE SYSTEM WITH TWO SINGLE CLOSED LOOPS

This application is based on the Provisional Patent application US61/001,063, filed on Oct. 31, 2007.

The present invention relates to a method and apparatus for a heat exchange system. There are known systems using refrigerants, heat exchange coils, and geothermal applications for extracting heat from the ground or warm waste water as well as staging a heat increase incrementally.

The present invention comprises a system based on optimum work ranges for various known refrigerants that can be adapted for diverse environments.

BACKGROUND

There is known U.S. Pat. No. 4,149,585 relating to a method for transferring heat between fluids with geothermal application. This invention uses the principle of a cascading heat transfer using the same refrigerant from compressor to compressor thus increasing its temperature. This is an efficient but very costly system.

There is also known U.S. Pat. No. 4,413,669 for a method of heat extraction from water through a expansion in stages.

There is also known U.S. Pat. No. 5,025,634 for a heating and cooling device that uses the earth's thermal energy. This device generates heat or cold through a heat pump that reverses the refrigerant flow depending on whether heat or cold is desired. There is a loss of efficiency in this design considering that the heat pump cannot perform both heating and cooling duties at maximum efficiency due to the fact that latent heat and thermal capacity of a liquid (for cooling) and vapor (for heating) are different.

There is also known U.S. Pat. No. 5,564,282 relating to a system for extracting thermal heat; this invention uses a heat pump as described in U.S. Pat. No. 5,025,634 and multiple parallel ground loops that can be cut off from the system individually to evacuate refrigerant in the cooling mode.

There is also known U.S. Pat. No. 4,391,104 from Jul. 5, 1982. The invention works in three modes, as described below:

First mode performs water heating with coil 14 and ambient air cooling with coil 23; this mode uses the first loop only. The heating condenser temperature should be 60° C. to be functional. The cooling evaporator temperature should be at least 15° C. to perform a reasonable cooling effect.

Third mode performs air heating with coil 31 and cooling fresh outside air with coil 38. This mode uses the second loop only. The heating condenser temperature should be at least 30° C. to get a feeling of a heating effect. The cooling evaporator temperature should be at less at −10° C. to be able to exchange in the winter condition.

Second mode is the water heating by cooling fresh air from outside, this mode uses two loops to perform water heating and cooling fresh air. The first loop should stays in accordance with the first mode. The second loop should stays in accordance with the third mode.

Minimum temperatures are as follows:
cooling ambient air (15° C.)
cooling fresh air in winter condition (−10° C.)
heating ambient air (30° C.)
heating water (60° C.)

The second mode is the closest prior art to the present invention, but major different between both systems is described below:

A minimum overlap temperature of 15° C. has to exist between first loop evaporator coil 23 and condenser coil 31. This overlap is very high compared to 4° C. for the present invention. This high overlap temperature result in efficiency losses from compressors and significantly affects the total efficiency of the bolt loop staged. This invention has a fixed overlap temperature compared to the present invention that can use many different combinations without affected heating ambient air temperature and cooling ambient temperature. This invention has a limited heating ambient air temperature compared to the present invention set at heating ambient air at 60° C. The tri-fluid exchanger 22 is used to stage energy to second loop and as cooling and heating coil. In the present invention, the coaxial staging exchanger 4 is used only as a bi-fluid heat exchanger. When in second mode, efficiency loses will occur on the tri-fluid coil 22 in an air duct because the aluminum fin core from the tri-fluid coil 22 will exchange with air from air duct instead of transferring to another loop. In the present invention, the coaxial staging exchanger 4 is insulated; when there is insulation around outer tube, there are no energy losses in the exchange with ambient air.

OBJECT OF THE INVENTION

The invention was conceived when it become clear that it will be ideal to split a single refrigerant loop into two separated loops connected in a cascade manner. The focus was to find a solution to solve the efficiency loss when the pressure ratio between low pressure side versus high pressure side is higher than 5. The combination of refrigerants is the key, since it is possible to use many kinds of refrigerants in combination and the system will work, but not at optimal performance efficiency. The combination of R-410a and R-134a is a very good and unique combination because many other refrigerants will be phased out in the future. R-410a and R-134a have been chosen in accordance with Montreal protocol regarding global warming. This combination is the solution to get the optimal compression ratio on both loops with temperature ranges of −10° C. to 60° C. Note that the lower temperature of −10° C. has been chosen to reduce the ground surface contact versus standard geothermal heat pumps. The gradient ground exchange is twice better than the standard heat pump system. This advantage gives the opportunity to reduce the number of drill holes, thus reducing cost for drilling. Another advantage of this system is to bring hot water to the final temperature. No space heater is needed to complete the heating cycle as the standard heat pump. This advantage gives more free energy from ground in the water heating application. Thirty percent of annual electricity consumption is for water heating. The result is that heat pump system costs 60% less than other geothermal heat pumps and gives 12% more money back than all other heat pump systems.

This invention has two main elements: (i) staging of heat exchange using the most ideal refrigerants to get maximum efficiency from work effected on these refrigerants and (ii) using the latent energy contained within the earth or warm waste water. The earth is a huge heat battery that is charged by the sun; 46% of all heat trapped by the earth is attributable to the sun. If ideal conditions exist, this heat is trapped within the earth and can easily be recaptured by the present invention. For example, ideal conditions include earth with high moisture content, since water has an excellent heat retention capacity. Sand is one of the least ideal conditions, since it dissipates stored heat very quickly after sunsets. The heat pump staging method could be use to supply hot water in the most popular heating system as radiant floor heat system, or for a hot water heating system. Warm wastewater is one of most common energy wastes in industry. The dairy, brewery, hospital laundry and juice industry use a lot of natural gas for heating water that will serve for washing applications or sterilization as pasteurization. The recuperation of this energy waste will help to reduce the global warming effect.

The invention is a staging method made with two single closed loops connected in a cascade arrangement. The condenser of the first loop is connected with the evaporator of the second loop. Coaxial coil is used in counter-flow direction to optimize the heat transfer between both fluids. The system uses two different refrigerants: refrigerant A and refrigerant B. The refrigerant A may be one of the following: R-22, R-404, R-410a, R-134a, R-507, R-426a and all substitutes of R-12, R-22 and R-502. The refrigerant B may be one of the following: R-123, R-124, R-134a, R-245fa and all substitutes of R-11, R-13, R-113.

Refrigerant A's role is to trap the ground or waste media energy; it is a refrigerant that should be appropriate for low temperature applications. Refrigerant B's role is to take the energy from the refrigerant A and bring the energy at a high temperature to exchange with air or water; it is a refrigerant that should be appropriate for high temperature applications. All refrigerant are carried inside a highly-conductive material such as copper.

SUMMARY OF THE INVENTION

The present invention relates to a heat exchanger comprising at least one first loop adapted to trap energy from a source. This first loop contains a first refrigerant adapted to collect said energy from said source. There is also at least one second loop containing a second refrigerant, this second refrigerant being adapted to interact with the first refrigerant and to transfer to a user a maximum quantity of energy that was extracted by the first loop in the most efficient manner. The transfer of trapped energy takes place in a transfer unit placed in said second loop.

The transfer unit comprises an outer cylinder with an inlet and an outlet that circulates the first refrigerant. An inner coil with an inlet and outlet is located within the outer cylinder. The inner coil is provided adapted to facilitate circulation of the second refrigerant. The first and second refrigerants move within the transfer unit in a counter-flow direction to optimize the heat exchange between the first and second refrigerants.

In one embodiment, the first loop is placed into an earth medium. In another embodiment, the first loop is placed within a waste medium. Both loops are made of copper piping. The first refrigerant is R-410a and the second refrigerant is R-134a. The inner coil is placed inside the outer cylinder in a coaxial manner.

The exchanger is powered by a natural gas engine, wherein the engine is provided with an additional heat exchanger adapted to trap energy emitted by exhaust gases produced by this engine; this trapped energy is fed into the second loop.

In yet another embodiment, the present invention relates to a heat exchanger comprising at least one first loop adapted to trap energy from a source. The first loop contains a first refrigerant adapted to collect energy from the source. There is at least one second loop containing a second refrigerant adapted to interact with the first refrigerant and to transfer to a user a maximum quantity of energy trapped by the first loop in the most efficient manner. The transfer of trapped energy takes place in a transfer unit placed in the second loop.

The transfer unit comprises an outer cylinder adapted to circulate said first refrigerant with an inlet and an outlet and an inner coil placed within the outer cylinder that is adapted to contain the second refrigerant. The inner coil is provided with an inlet and outlet adapted to facilitate circulation of the second refrigerant. The first and said second refrigerants move within the transfer unit in a counter-flow direction to optimize the heat exchange between the two refrigerants. The first loop is placed into an earth or waste medium. Both loops are made of copper piping. The first refrigerant is R-410a and second refrigerant is R-134a. The coil is placed within said outer cylinder in a coaxial manner.

The exchanger is powered by a natural gas engine provided with an additional exchanger adapted to trap energy emitted by exhaust gases produced by the engine; the trapped energy is fed into the second loop.

In still another embodiment of the present invention, the exchanger comprises a plurality of first loops.

DETAILED DESCRIPTION OF THE PRESENT INVENTION

Figure 1:
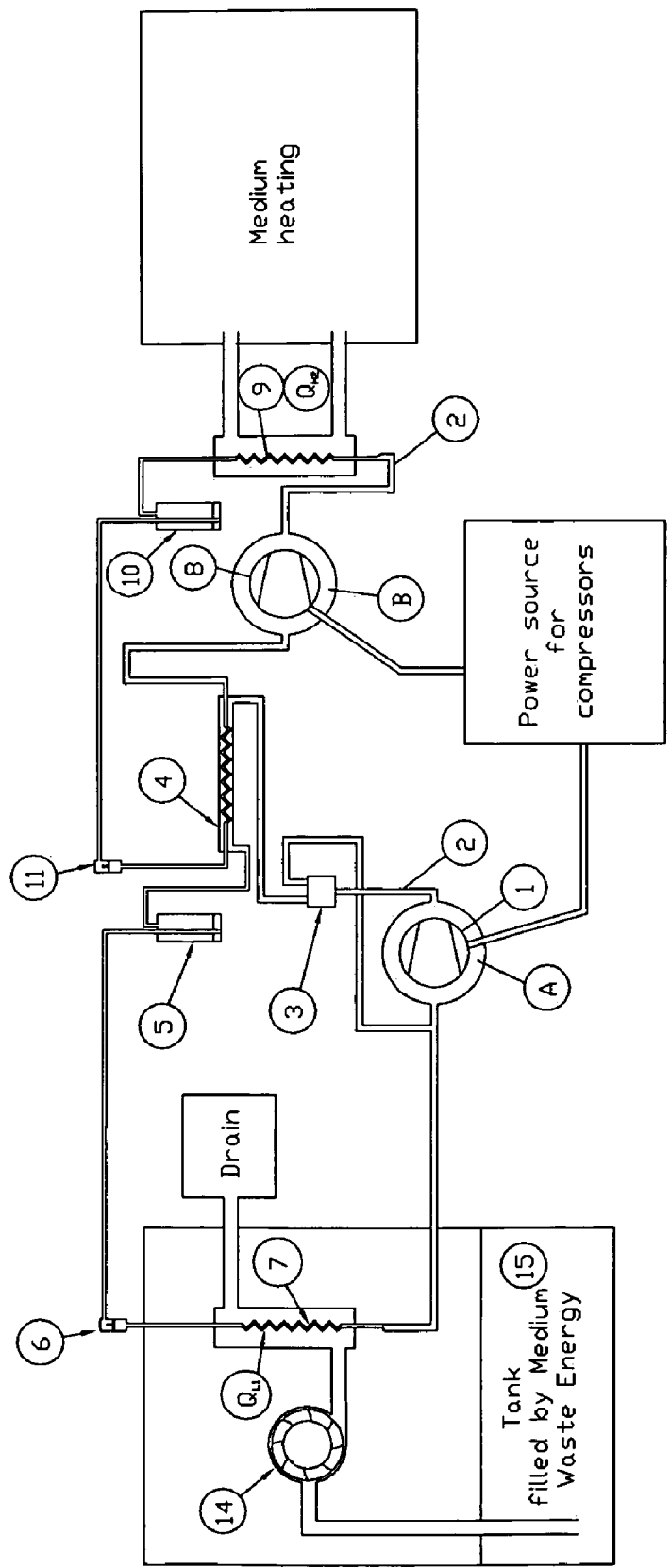
FIG. 1 shows a block-diagram of the first embodiment of the present invention.
Figure 2:
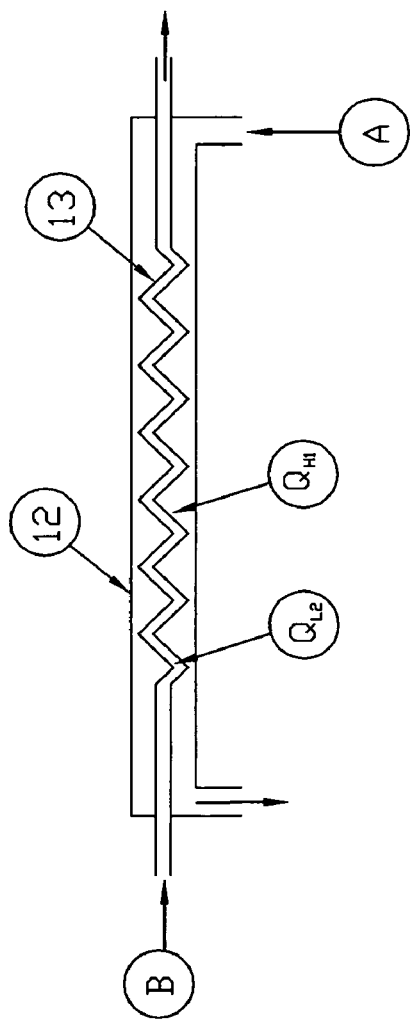
FIG. 2 is a fragment showing a transfer unit of FIG. 1.

The present invention optimizes known prior art systems into a cascade of heat exchange. There are two closed loops (see FIGS. 1 and 3) that can be integrated together to yield optimal results. Referring now to FIGS. 1 and 2:

First loop comprises a copper piping system 2 filled with refrigerant A. The refrigerant A, in vapor form, is compressed by a scroll or screw compressor 1 thus turning into a liquid in the outer cylinder 12 of a transfer unit 4. Outer cylinder 12 has inlet and outlet to facilitate circulation of refrigerant A within the first loop. Refrigerant A has a condenser capacity $Q_{H1}$ and is provided to transfer latent heat to the refrigerant B to an inner coil 13 placed within said transfer unit 4 in coaxial manner. Inner coil 13 is provided with an inlet and outlet to facilitate circulation of refrigerant B within the second loop. Refrigerant B has an evaporator capacity $Q_{L2}$. A by-pass valve 3 is located between the outer cylinder 12 of transfer unit 4 and the compressor 1 to balance the refrigerant A capacity with the second closed loop capacity, to get the equation of $Q_{H1}=Q_{L2}$; the condenser capacity $Q_{H1}$ from the first loop with refrigerant A should be equal to the evaporator capacity $Q_{L2}$ of the second loop with refrigerant B. Refrigerant A of outer tube 12 and refrigerant B of the inner coil move in counter flow arrangement to optimize the exchange between those two refrigerants. The liquid and gas refrigerant A passes through a receiver tank 5, through the expansion valve 6, and is released at low pressure into the exchanger 7, which is the evaporator capacity $Q_{L1}$. Receiver tank 5's function is to act as a liquid distributor; it comprises a tubing system that permits only liquid to pass. The liquid refrigerant A is evaporated by absorbing the latent energy of its surroundings, being either warmth from the ground, warmth from wastewater or air. After evaporation, the refrigerant A is pumped by the suction line that goes to the compressor 1, and the cycle repeats.

Bypass valve 3 is not always necessary. It adds a level of adjustability to the system and works like an adjustable three-way valve. The valve is used to limit the flow refrigerant by filling refrigerant in the other tube connected to suction line at low pressure compressor inlet. This method to bypass hot gas is used to control refrigerant A's condenser capacity. This bypass method is the better way to limit energy losses from an oversize compressor. Control of refrigerant flow translates to control of refrigerant condenser capacity. A fraction of the hot gas returns directly to suction line. This is for energy conservation. The hot gas that returns to the suction line has already been compressed and does not require additional energy to be compressed.

The temperature exchange between refrigerants A & B change depending on the combination of refrigerants, but the target is to have an overlap of 4° C. between condensing temperature of refrigerant A versus evaporating temperature of refrigerant B (ex.: If refrigerant A condenses at 30° C., refrigerant B should evaporate at 26° C.). The compressor flow should be in accordance with equation $Q_{H1}=Q_{L2}$, noted that first loop compressor is a little oversized to permit an adjustment between the loops with the by-pass valve.

Second loop comprises copper piping system 2 filled with refrigerant B. Refrigerant B, in vapor form, is compressed by a scroll or screw compressor 8 thus turning into a liquid in condenser coil 9 having condenser capacity $Q_{H2}$ and giving latent heat to water or air. The liquid and gas refrigerant go to the receiver tank 10. Liquid from receiver tank passes through the expansion valve 11. The liquid refrigerant B is released at low pressure into the inner coil 13 of the transfer unit 4 at evaporator capacity $Q_{L2}$. The liquid refrigerant B evaporates by absorbing the latent energy from the outer cylinder 12 of the transfer unit 4, which has condenser capacity $Q_{H1}$. After evaporation, the refrigerant B is pumped by the suction line that goes to the compressor 8, and the cycle repeats.

FIG. 1 shows a first embodiment of the present invention wherein a source of energy is waste media, such as water or air. In this embodiment the exchanger is used to chill the warm wastewater in a chiller coil 7. This waste media is stored in a tank 15, and is pumped into chiller coil 7 by means of centrifugal pump 14. After waste media passes through chiller coil 7, it proceeds to a drain. This first embodiment may be widely used to recover lost energy from food production industry, hospitals or any other facilities where it is important to sterilize products.

Figure 4:
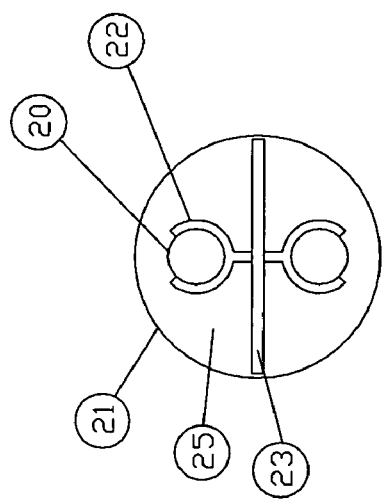
FIG. 4 shows a cross-section along lines A-A of first loop of FIG. 3.
Figure 3:
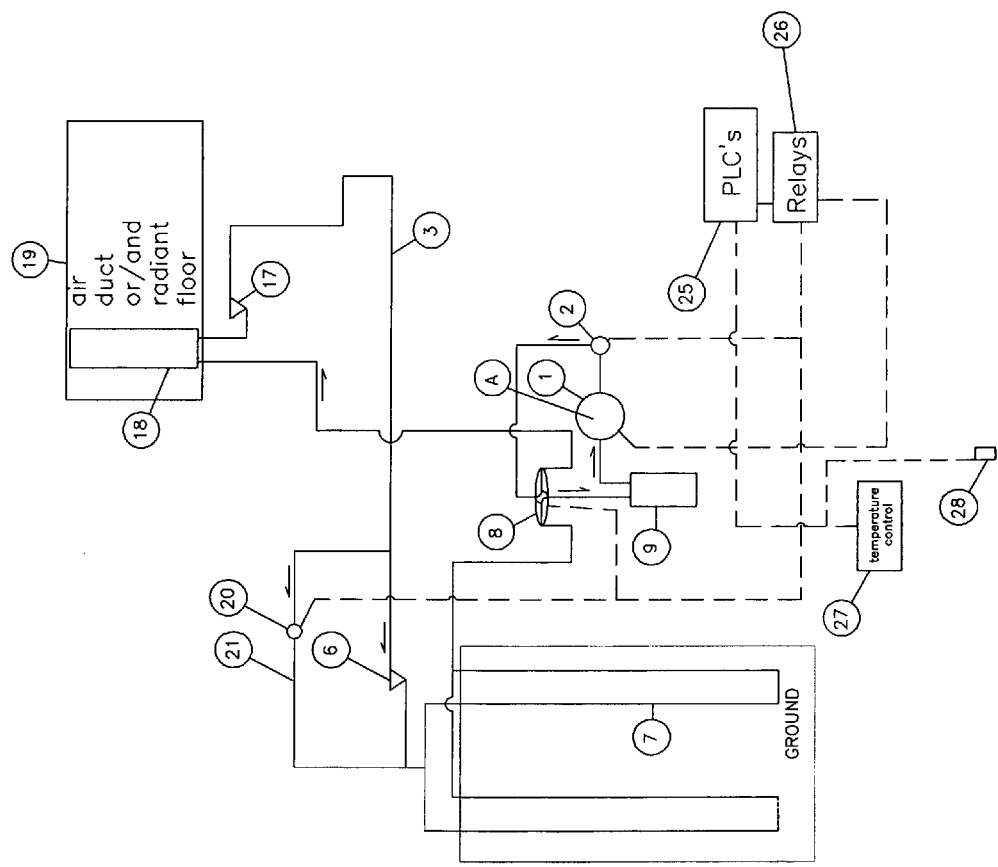
FIG. 3 shows a block-diagram of the second embodiment of the present invention.

In the second embodiment of the present invention, the first loop traps energy from the ground as shown on FIGS. 3 and 4. The refrigerant A is released from the expansion valve 6 to low pressure into the copper tube 20, which is the evaporator coil with evaporator capacity $Q_{L1}$. The coil shape is two parallel copper tubes 20 welded at their ends with a U copper fitting. The gap between both tubes is held with plastic attachments 22 every 4 feet. Preferably, the system should comprise many loops comprising tube 20, inserted into holes dug in the earth 21, being 3 inches in diameter and 50 feet deep. A thermal rigid insulation 23 of 2½ inches long is inserted between both tubes 20, passing through the plastic attachments 22 before snapping to the other tube 20. All loops 20 are poured into the ground holes 21 with conductive grout 25. The insulation is there to optimize the heat exchange. The system would still work without insulation 23, but not as well as the system seen in FIG. 4.

The ground exchanger of FIG. 3 is made by drilling holes in the earth 3" in diameter and 50 feet deep with 15 degree angle penetration performed by a drilling machine. Copper tube loops with insulation separators between tubes to cut thermal bridge between both tubes 20. It is possible to use plurality of loops (not shown) to meet the appropriate capacity, wherein all loops are connected in parallel.

Figure 5:
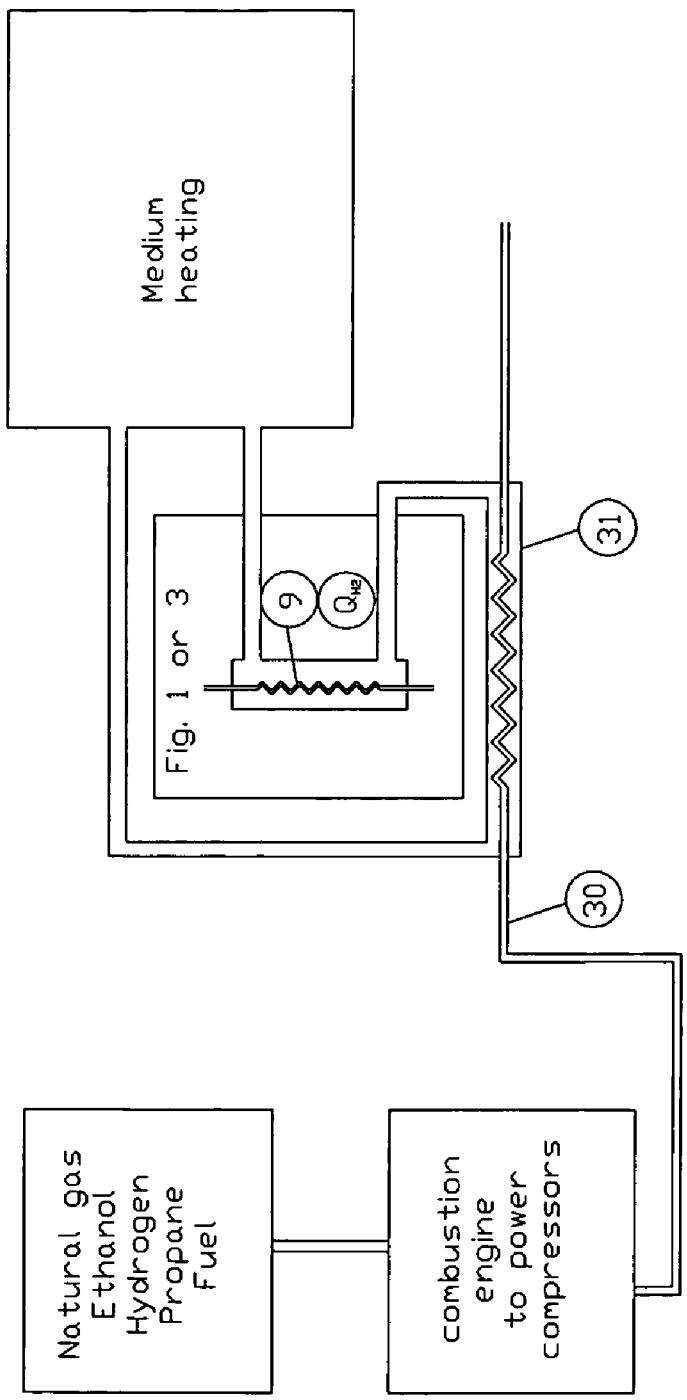
FIG. 5 shows a block-diagram of power source according to the present invention.
Figure 6:
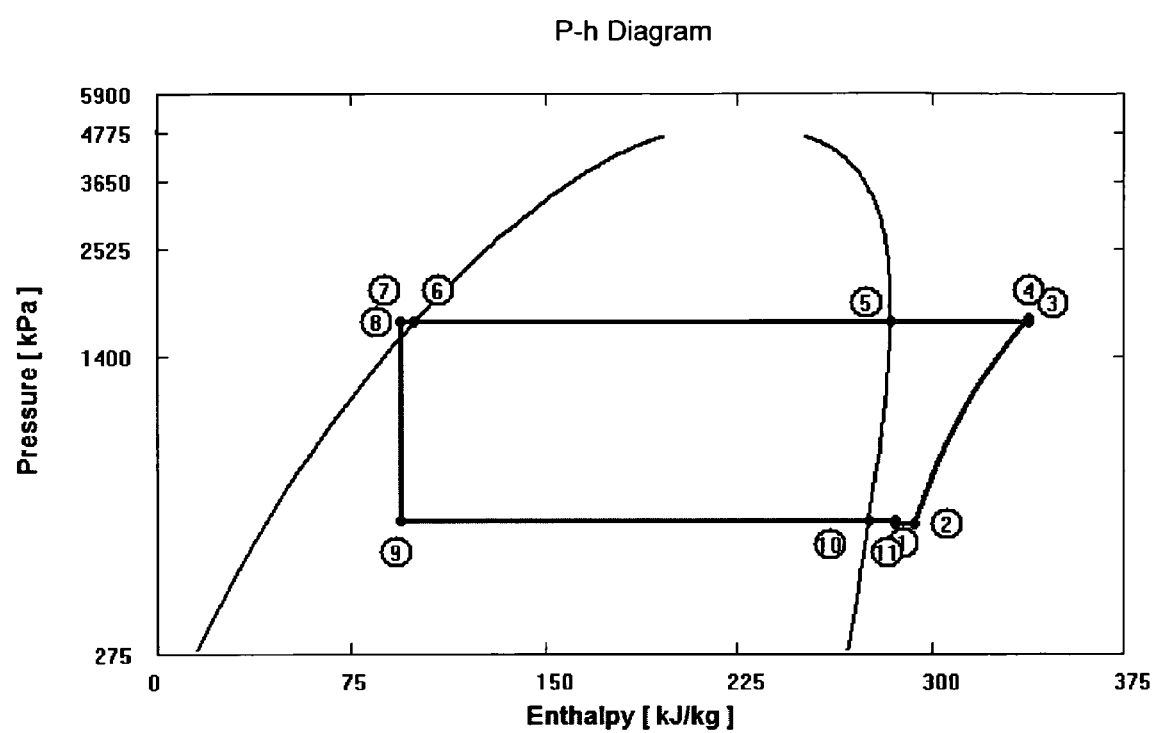
FIG. 6 shows a P-h diagram of first loop.
Figure 7:
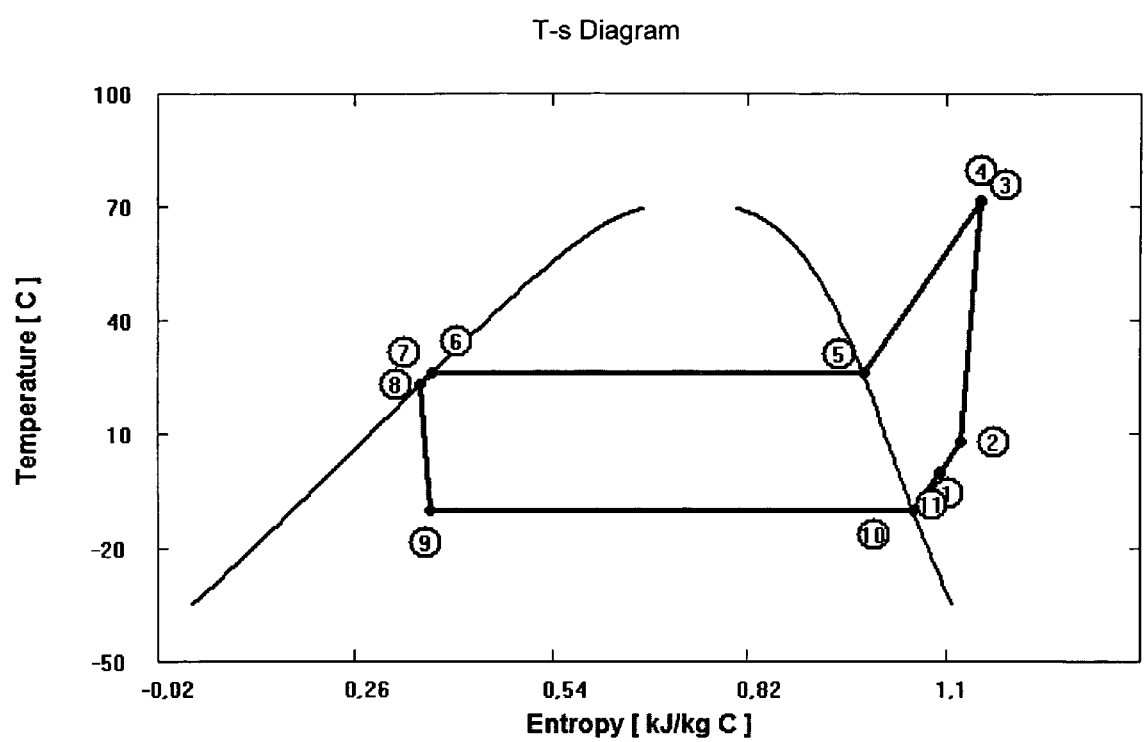
FIG. 7 shows a T-s diagram of first loop.

Embodiments of FIGS. 1 and 3 show a heat exchanger using electricity as a power source. However, in case there is a shortage of electricity, it is possible to use natural gas to power a combustion engine as shown on FIG. 5 to power compressors of first and second loops. In this embodiment, the exhaust line 30 carrying the hot gas from the combustion engine passes through a heat exchanger 31 which is filled with the waste recovery system output. The system carries hot medium up to 100° C., if required. The performance of such system is twice as efficient as all other known gas heating systems FIGS. 6 and 7 show P-h and T-s diagrams illustrating the first loop of the present invention using cycle with R-410a type of refrigerant A in the range from −10° to 26° C. On FIG. 1, the line between points 9-11 illustrates behavior of evaporator 7 with capacity $Q_{L1}$. Line between points 4-4 shows superheat—condensing of refrigerant A with capacity $Q_{H1}$. The line between points 2-3 shows behavior of vapor gas (compressed) from exchanger 7. Line between points 8-9 shows behavior of liquid refrigerant A released to low pressure. As shown on FIG. 7, maximum temperature is 72° C., and no compressor oil deterioration will happen. Optimal ratio compression is 3.06.

Figure 8:
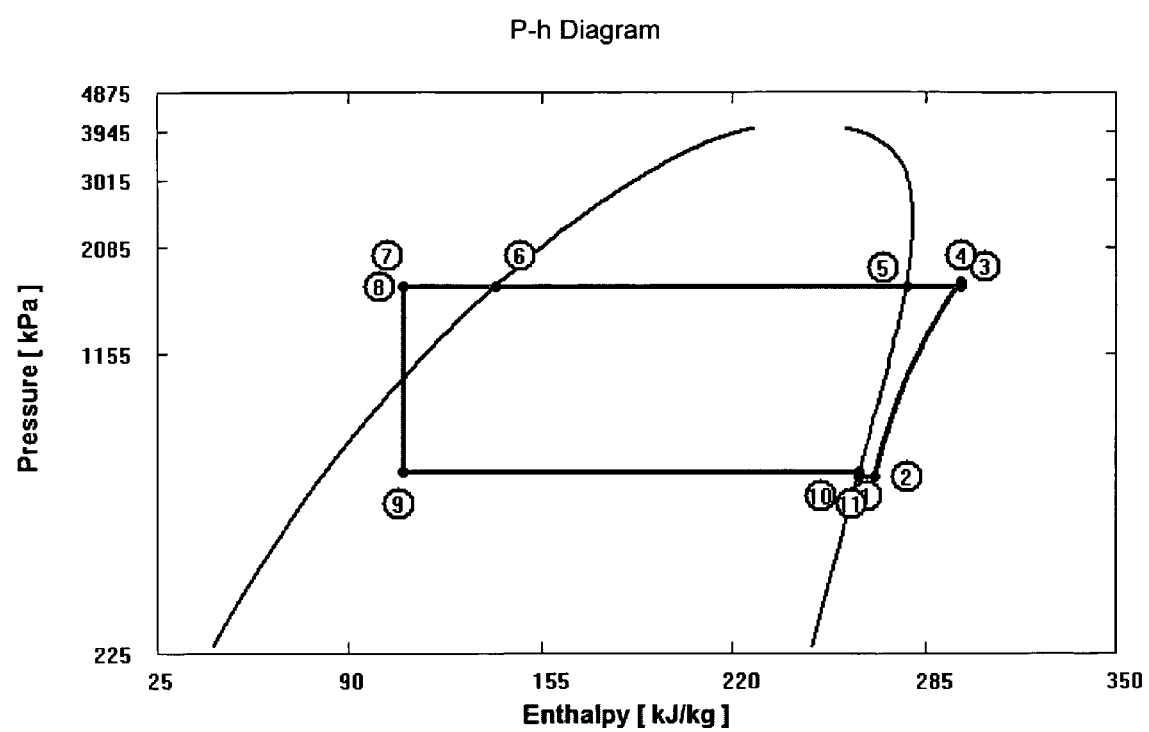
FIG. 8 shows a P-h diagram of second loop.
Figure 9:
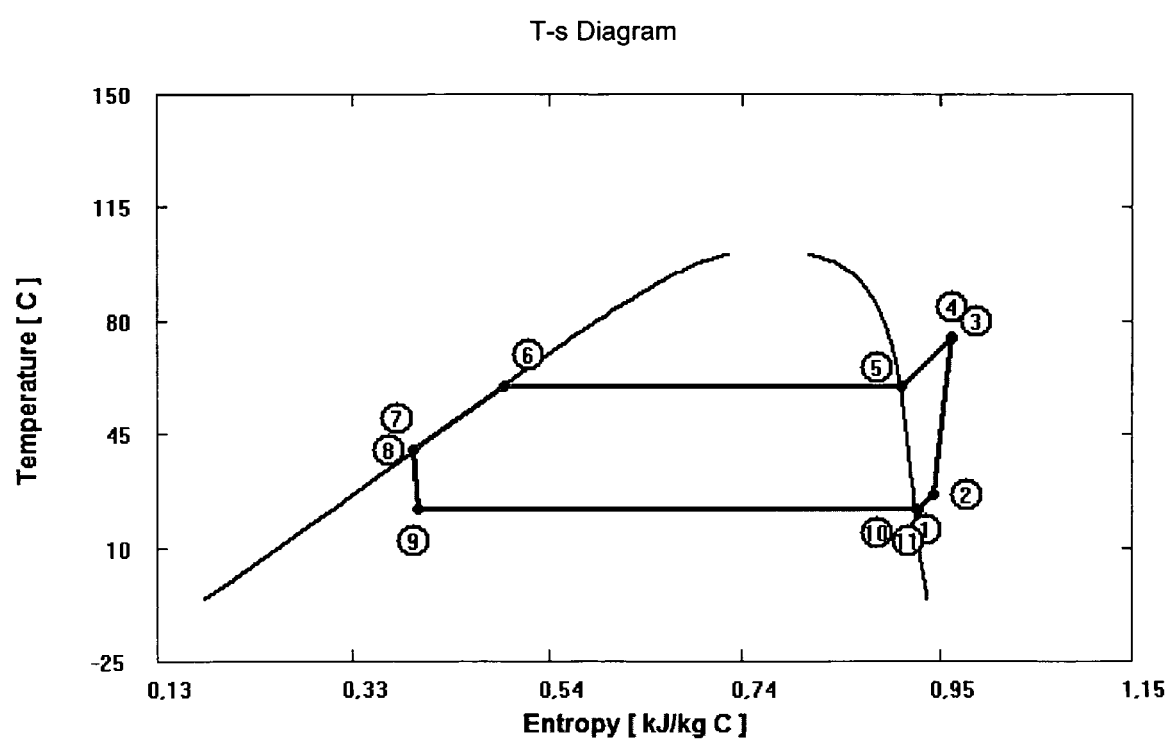
FIG. 9 shows a T-s diagram of second loop.

FIGS. 8 and 9 show P-h and T-s diagrams of the second loop of the present invention. As seen on FIG. 8, line between point 9-11 shows behavior of refrigerant B having evaporation capacity $Q_{L2}$. Line between 2-3 shows compressing of vapor gas from refrigerant B having capacity $Q_{L2}$. Line from points 3-7 shows exchange of superheat—condensation of condenser 9 having capacity $Q_{H2}$. Line between points 8-9 shows the liquid refrigerant B released to low pressure.

FIG. 9 shows that maximum temperature is 75° C., being acceptable for compressor oil without any deterioration. Optimal ratio compression is 2.92.

Figure 10:
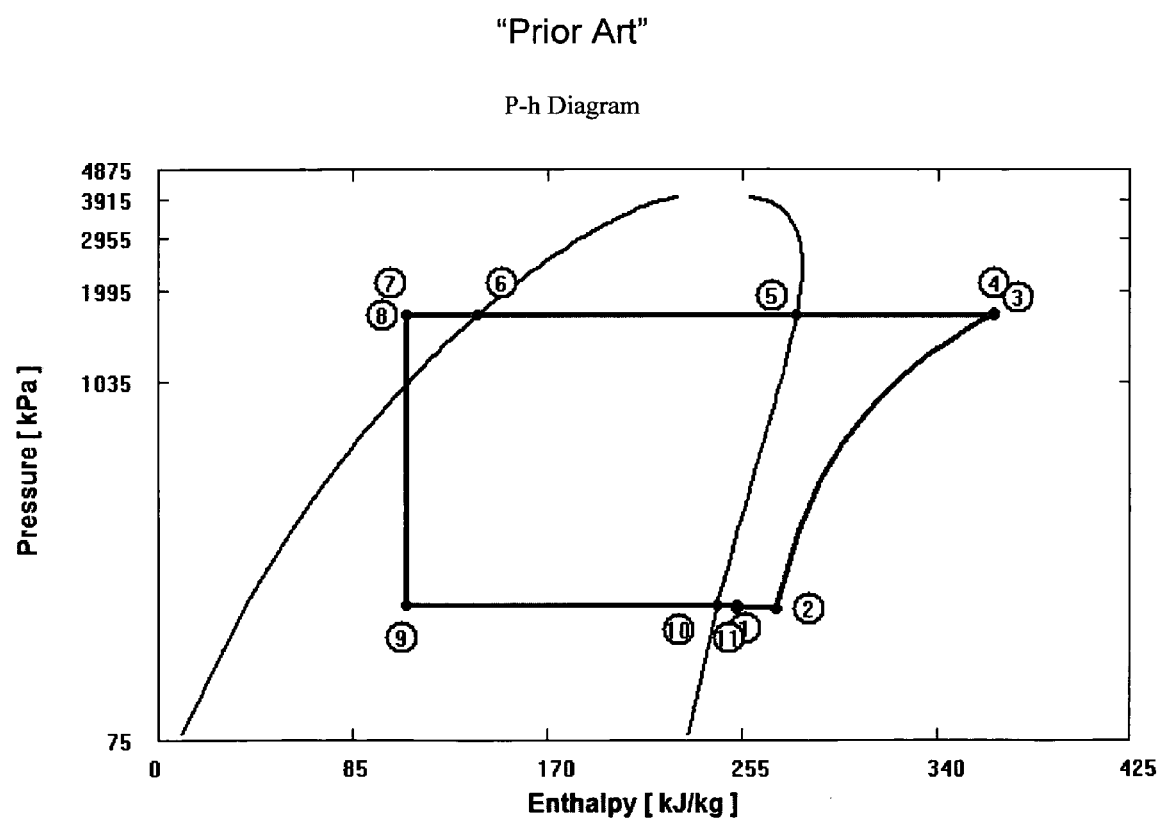
FIG. 10 shows a P-h diagram of prior art.
Figure 11:
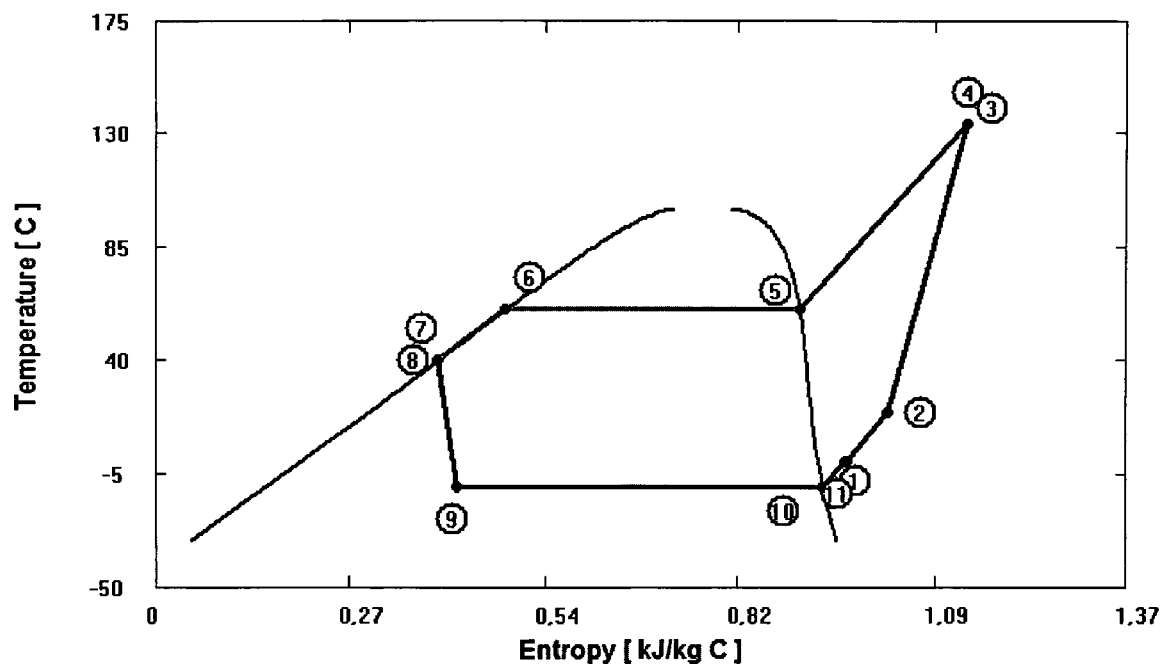
FIG. 11 shows a T-s diagram of prior art.

FIGS. 10 and 11 show P-h and T-s diagrams of the prior art system, wherein maximum temperature reaches 134° C. causing compressor oil to deteriorate and extreme compression ratio is 8.65. Such system is of a lower efficiency if compared with two loops of the present invention, since a high ratio compression results in lowered efficiency from isentropic compression. In this case, a compressor will fail due to extreme temperature.

The main advantages of this invention are as follows:
Refrigerants A and B can have different characteristics in each loop depending on the target result. For example, Freon R-22 behaves according to a certain curve with a certain critical point and a certain ratio of benefit versus cost. Freon R-123 has completely different characteristics. The invention permits a user to set up the cascade of loops according to the most energy-efficient model of refrigerants in function of differential temperature between the two stages.
The invention is completely modular, allowing to extract the maximum free energy contained in the environment or heat recovery from wastewater. If one loop is not practical, many different combinations in cascade are possible to attain a useful result.
All refrigerant pumps can be easily aligned to rotate only in one direction. There is an inherent loss of efficiency when a pump has to reverse direction to reverse fluid flow. This invention, through a series of valves and tubes, is designed to be capable of a linear flow without reversing.

The system of the present invention is 12% more efficient than any known geothermal system with annual consumption of 30% less for water heating and 50% less for air heating. There is no known equipment available to perform a cycle from the temperature of −10° C. to 60° C. The standard geothermal heat pump has a cycle temperatures of from 0° C. to 37° C. with an optimal compression ratio of 3.5

With present system, it is necessary to dig a hole 50% shallower than in known systems.

Refrigerants for both loops are environmentally friendly.

Installation costs are only a one-time expense with minor maintenance costs and a lifetime over 25 years.

It is 50% cheaper to built system of the present invention than other similar systems.

The present invention can bring water to high temperature (60° C.) with the cost at least 30% cheaper than oil and 50% cheaper than natural gas.

If necessary, more than one first loop can be used to bring water to a temperature of 80° C. or more.

Conventional systems are limited to increase temperature over 37° C. efficiently when the cool source media is below zero Celsius.

In waste media embodiment, it is possible to recover more than 100% of wasted energy, such as in food processing industry.

The waste water after cooling can be use as cooling media to replace the electric HVAC and eliminate the cooling operating cost in the summer condition. In essence, the system will create air conditioning.

Thus, it can be seen that the objects of the present invention have been satisfied by the structure presented hereinabove. While in accordance with the Patent Statutes, only the best mode and preferred embodiments of the present invention have been presented and described in detail, it is to be understood that the invention is not limited thereto or thereby. Accordingly, for an appreciation of the true scope and breadth of the invention, references should be made to the following claims.

The invention claimed is:

1. A heat exchanger comprising two single closed loops connected in a cascade arrangement consisting of:
   at least one first loop adapted to trap energy from
   a source,
   said first loop contains a first refrigerant adapted to collect said energy from said source;
   at least one second loop containing
   a second refrigerant, said second refrigerant adapted to interact with said first refrigerant and to transfer to a user a maximum quantity of said energy trapped by said first loop in the most efficient manner,
   wherein the transfer of said trapped energy takes place in a transfer unit, wherein said transfer unit is placed in said second loop,
   wherein said transfer unit comprises
   an outer cylinder adapted to contain said first refrigerant, said outer cylinder is provided with an inlet and an outlet adapted to circulate said first refrigerant, and
   an inner coil placed within said outer cylinder, said inner coil is adapted to contain said second refrigerant, said inner coil is provided with an inlet and outlet adapted to facilitate circulation of said second refrigerant,
   wherein said transfer is facilitated by interaction between said first refrigerant contained in said outer cylinder and said second refrigerant contained in said inner coil completely submerged in said first refrigerant,
   wherein said first refrigerant is separated from said second refrigerant by a single layer wall of said inner coil, and
   wherein said first refrigerant and said second refrigerant are combined in a predetermined manner to provide optimal performance efficiency and optimal compression ratio for both loops.

2. Heat exchanger according to claim 1, wherein said first and said second refrigerant are moving within said transfer unit in a counter-flow direction to optimize the heat exchange between said first and second refrigerant, and wherein said first refrigerant is adapted for a low temperature application, and said second refrigerant is adapted for a high temperature application.

3. Heat exchanger according to claim 1, wherein said first loop is placed into an earth medium.

4. Heat exchanger according to claim 1, wherein said first loop is placed within a waste medium.

5. Heat exchanger according to claim 1, wherein said first and second loop are made of copper piping.

6. Heat exchanger according to claim 2, wherein said first refrigerant is R-410a and said second refrigerant is R-134a.

7. Heat exchanger according to claim 1, wherein said inner coil is placed within said outer cylinder in a coaxial manner.

8. Heat exchanger according to claim 1, wherein said exchanger is powered by a natural gas engine, wherein said engine is provided with an additional heat exchanger adapted to trap energy emitted by an exhaust gas produced by said engine, said trapped energy is fed into said second loop, and wherein each loop is provided with a compressor facilitating optimal ratio compression and adapted to prevent compression oil deterioration.

9. A heat exchanger comprising:
   at least one first loop adapted to trap energy from
   a source,
   said first loop contains a first refrigerant adapted to collect said energy from said source;
   at least one second loop containing
   a second refrigerant, said second refrigerant adapted to interact with said first refrigerant and to transfer to a user a maximum quantity of said energy trapped by said first loop in the most efficient manner,
   wherein the transfer of said trapped energy takes place in a transfer unit, wherein said transfer unit is placed in said second loop, wherein said transfer unit comprises
   an outer cylinder adapted to contain said first refrigerant, said outer cylinder is provided with an inlet and an outlet adapted to circulate said first refrigerant, and
   an inner coil placed within said outer cylinder, said inner coil is adapted to contain said second refrigerant, said inner coil is provided with an inlet and outlet adapted to facilitate circulation of said second refrigerant,
   wherein said transfer is facilitated by interaction between said first refrigerant contained in said outer cylinder and said second refrigerant contained in said inner coil completely submerged in said first refrigerant,
   wherein said first refrigerant is separated from said second refrigerant by a thin wall of said inner coil, and
   wherein said first refrigerant and said second refrigerant are combined in a predetermined manner to provide optimal performance efficiency and optimal compression ratio for both loops.

10. Heat exchanger according to claim 9, wherein said first and said second refrigerant are moving within said transfer unit in a counter flow direction to optimize the heat exchange between said first and second refrigerant, and wherein said first refrigerant is adapted for a low temperature application, and said second refrigerant is adapted for a high temperature application.

11. Heat exchanger according to claim 9, wherein said first loop is placed into an earth medium.

12. Heat exchanger according to claim 9, wherein said first loop is placed within a waste medium.

13. Heat exchanger according to claim 9, wherein said first and second loop are made of copper piping.

14. Heat exchanger according to claim 10, wherein said first refrigerant is R-410a and said second refrigerant is R-134a.

15. Heat exchanger according to claim 9, wherein said coil is placed within said outer cylinder in a coaxial manner.

16. Heat exchanger according to claim 9, wherein said exchanger is powered by a natural gas engine, wherein said engine is provided with an additional exchanger adapted to trap energy emitted by an exhaust gases produced by said engine, said trapped energy is fed into said second loop, and wherein said first and said second loops are provided with a compressor facilitating optimal ratio compression and adapted to prevent compression oil deterioration.

17. Heat exchanger according to claim 11, wherein said exchanger comprises a plurality of first loops.

* * * * *